United States Patent [19]

Seitz

[11] Patent Number: 4,884,776
[45] Date of Patent: Dec. 5, 1989

[54] EXTERIOR MIRROR FOR A VEHICLE

[75] Inventor: Edwin Seitz, Neuenbuch, Fed. Rep. of Germany

[73] Assignee: Hohe KG, Collenberg, Fed. Rep. of Germany

[21] Appl. No.: 255,601

[22] Filed: Oct. 11, 1988

[30] Foreign Application Priority Data

Oct. 9, 1987 [DE] Fed. Rep. of Germany ....... 3734254

[51] Int. Cl.[4] .............................................. A47G 1/24
[52] U.S. Cl. .................................... 248/481; 248/549; 248/900
[58] Field of Search ............... 248/900, 549, 476, 479, 248/481, 483, 484; 350/635, 631, 632

[56] References Cited

U.S. PATENT DOCUMENTS 3,599,926  8/1971  Takahashi ...................... 248/549 X
4,548,483  10/1985 Moro .................................. 350/635

FOREIGN PATENT DOCUMENTS 2544837  4/1976  Fed. Rep. of Germany ...... 248/900
2546759  4/1977  Fed. Rep. of Germany ...... 248/900
7729371  1/1978  Fed. Rep. of Germany .
2838465  9/1978  Fed. Rep. of Germany .
2857558  7/1980  Fed. Rep. of Germany ...... 350/635
3125701  3/1983  Fed. Rep. of Germany .
3307532  9/1984  Fed. Rep. of Germany .
3434959  4/1986  Fed. Rep. of Germany .
2802502  7/1989  Fed. Rep. of Germany .
2521083  2/1983  France .
57-7734  1/1982  Japan ................................ 350/635
1000350  8/1965  United Kingdom ................ 248/900
2164617  3/1986  United Kingdom ................ 350/362
2202574  2/1988  United Kingdom .

OTHER PUBLICATIONS

Title-Gebrauchsmusteranmeldung; published by/-Societe Commerciale Du Comptoir; Inventor; Kugelgelenk.

Primary Examiner—J. Franklin Foss
Attorney, Agent, or Firm—Fleit, Jacobson, Cohn, Price, Holman & Stern

[57] ABSTRACT

An exterior mirror for a vehicle includes a mirror housing in which a mirror is fixed and which is held in normal use position on a mirror mounting and can be swung forwards and backwards relative to the mirror mounting, with a retention member fixed on the mirror mounting extending into the mirror housing. One part of the mirror mounting protrudes from the vehicle body when fitted on the vehicle body so that, in the normal use position, the mirror housing completely laterally surrounds the one part of the mirror mounting, and an edge of the mirror housing which is at the mirror mounting side, rests without pressure against the vehicle body. Furthermore, a retention member which is fixed on the mirror mounting and extends into the mirror housing has at least one flexible band which is anchored at one end at the mirror mounting and extends through a slot in a transverse wall of the mirror housing, the transverse wall being situated at the mirror mounting side.

14 Claims, 2 Drawing Sheets

EXTERIOR MIRROR FOR A VEHICLE

FIELD OF THE INVENTION

The invention relates to an exterior mirror for a vehicle having a mirror housing in which a mirror is fixed and which is held in a normal use position on a mirror mounting and which can be swung forwards and backwards relative to the mirror housing. A retention member is fixed on the mirror mounting and extends into the mirror housing. The mirror mounting has at least one part which, when the mirror mounting is fixed on a vehicle body, protrudes from the vehicle body.

BACKGROUND OF THE INVENTION

In the exterior mirror described in German Utility Model Specification 7,729,371, the mechanism allowing swing-away of the mirror housing from the mirror mounting upon impact is a complex structure which comprises a massive link coupled pivotably to the mirror housing and the mirror mounting. Moreover said link is at least partially exposed to the exterior of the mirror so that dirt and water may find a way to the mechanism and may give cause to substantial wear of the link. Thus, the object on which the invention is based is to improve the functional reliability of the mechanism and to reduce substantially the expenditure involved in producing the exterior mirror. At the same time, however, it must continue to be ensured that the exterior mirror continues to be held in vibration-free manner in its normal use position on the mirror mounting and that, furthermore, in fulfillment of safety regulations, the mirror housing can swing forwards and backwards relative to the mirror mounting in accordance with an impact, i.e., it must be capable of being swung away from its normal use position. At the same time, the mirror housing which has been swung away must remain connected to the mirror mounting in such a manner that it can be guided back into the normal use position.

SUMMARY OF THE INVENTION

To achieve this object, the invention envisages that, in the normal use position, the mirror housing should completely laterally surround that part of the mirror mounting which protrudes from the vehicle body and that that edge of the mirror housing which is at the mirror mounting side should rest without pressure against the vehicle body. The mirror mounting part protruding from the vehicle body can thereby be kept considerably smaller, and in particular the hitherto conventional lateral covering of the mirror mounting which ensured a smooth transition from the external contour of the mirror housing to the contour of the vehicle body can be completely omitted.

As a further development of the invention, it is to be recommended that an elastic sealing strip be laid between that edge of the mirror housing which is at the mirror mounting side and the vehicle body. The strip seals the interior of the mirror housing and any adjusting mechanism for the mirror which may be provided. The adjusting mechanism passing through the mirror mounting is protected by the strip against moisture, water, and dirt.

In a preferred embodiment of the invention, it is furthermore provided that during the swinging away of the mirror housing, forwards or backwards, relative to the mirror mounting, one edge section of the mirror housing at the mirror mounting side is supported, in each case, on one projecting shoulder of the mirror mounting part.

The pressureless contact of the edge of the mirror housing on the vehicle body in the normal use position can be ensured, in particular, in the case of exterior mirrors, the mirror housing of which is, for example, held, in accordance with the teachings of German Auslegeschrift 2,838,464, by means of one or more tension springs on the mirror mounting, in that inner contact surfaces of the mirror housing rest against corresponding seating surfaces on the mirror mounting. In other embodiments of exterior mirrors, in which the mirror housing is held on the mirror mounting by means of a releasable snap-in connection, this snap-in connection can absorb the tensile force of a retention spring.

According to another concept for solving the object of the present invention, which can be combined with particular advantage with the above-mentioned features of the exterior mirror, it is provided according to the invention that the retention member comprises at least one flexible elongated flat band which is anchored at one end at the mirror mounting and extends through a longitudinal upright slot in an inner part of the mirror housing which part is proximate to the mirror mounting when the mirror housing assumes its normal use position. The inner part of the mirror housing may be realized by a transverse wall of the mirror housing. While dispensing with the tension springs hitherto frequently used in exterior mirrors, the mirror housing can thereby be held in the normal use position on the mirror mounting, for example, by a snap-on connection according to the above-mentioned utility model, the slot guidance of the mirror housing on the flexible band during swinging away reliably preventing the mirror housing from falling off the mirror mounting. From a swung-away position, the mirror housing can be fixed manually in the normal use position again by snapping the mirror housing on the mirror mounting.

The flexible band preferably consists of spring steel which ensures that the swing-away mirror housing returns at least to a position near to the normal use position. Furthermore, the band is bent laterally at its free end, to engage behind the slot in each of the end positions of the swung-away mirror housing and hence defines these two end positions of swinging-away movement.

As a further embodiment of the invention, the guidance of the mirror housing during the swinging-away movement from the mirror mounting is improved if the retention member has two bands of the same type which are arranged one above the other and which are vertically spaced.

The combination of the two inventive ideas, each individually contributing to the solution of the object of the present invention, is made possible in a particularly advantageous manner, for example, in that two retention elements arranged one above the other are located approximately in the center of the mirror mounting. Elastic clips project from a transverse wall of the mirror housing at the mirror mounting side, which clips grip the retention elements in the normal use position of the mirror housing.

While, in principle, that end of the band or bands which is at the mirror mounting side can be anchored next to the retention elements in the mirror mounting, a particularly expedient embodiment of the invention provides that a slot is formed in at least one of the clips and that the retention element associated with the clip is likewise slotted, that end of the band which is at the mirror mounting side being anchored in the slotted retention element. For the manual fixing of the swung-away mirror housing on the mirror mounting, using this embodiment, a direct guidance for the mirror housing onto the slotted retention element is produced.

The retention elements preferably have a cylindrical outer contour around which the clips engage, enabling the band to be given a sufficient width to improve its guiding function. Two opposing slide pieces are advantageously arranged in the slot, each resting on one side of the band. If, as mentioned, the slot is formed in the clips, the clips elasticity ensures that when the mirror housing is swung away, the slide pieces are pressed against the side faces of the band, providing a sufficient brake against a free oscillation of the mirror housing which has been swung away. This braking effect and also the retaining force of the clips is further improved if a wire spring engages around the opposing fingers of each clip.

BRIEF DESCRIPTION OF THE DRAWINGS

The invention is explained in detail below with reference to an exemplary embodiment illustrated in the attached drawings, in which.

DESCRIPTION OF THE PREFERRED EMBODIMENTS

Figure 1:
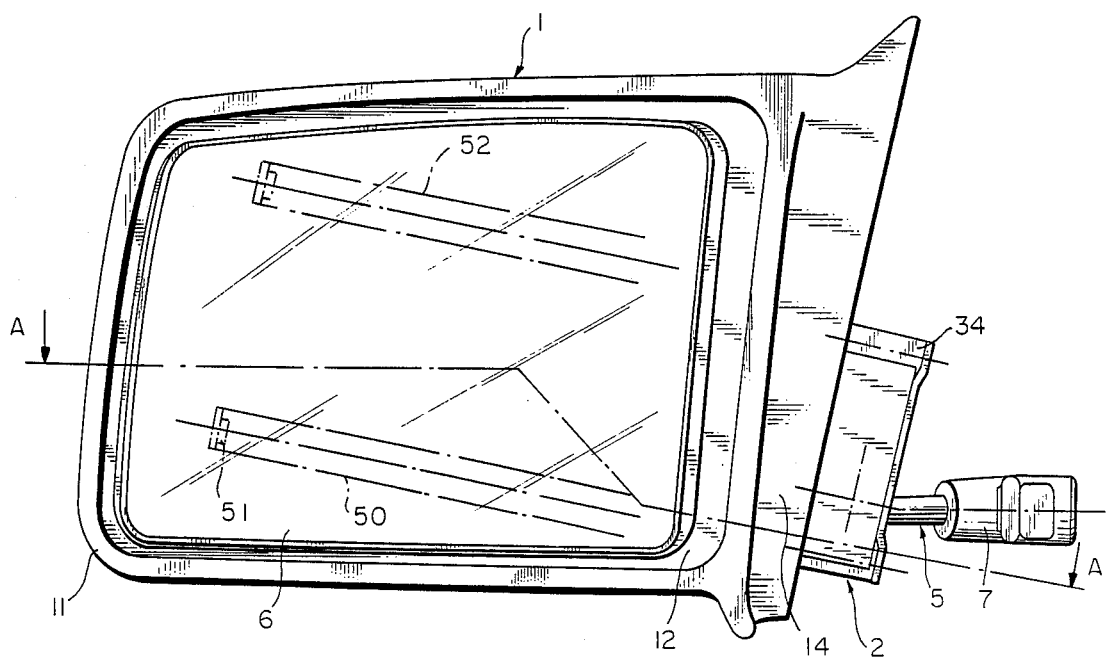
FIG. 1 shows a rear view of an exterior mirror.
Figure 2:
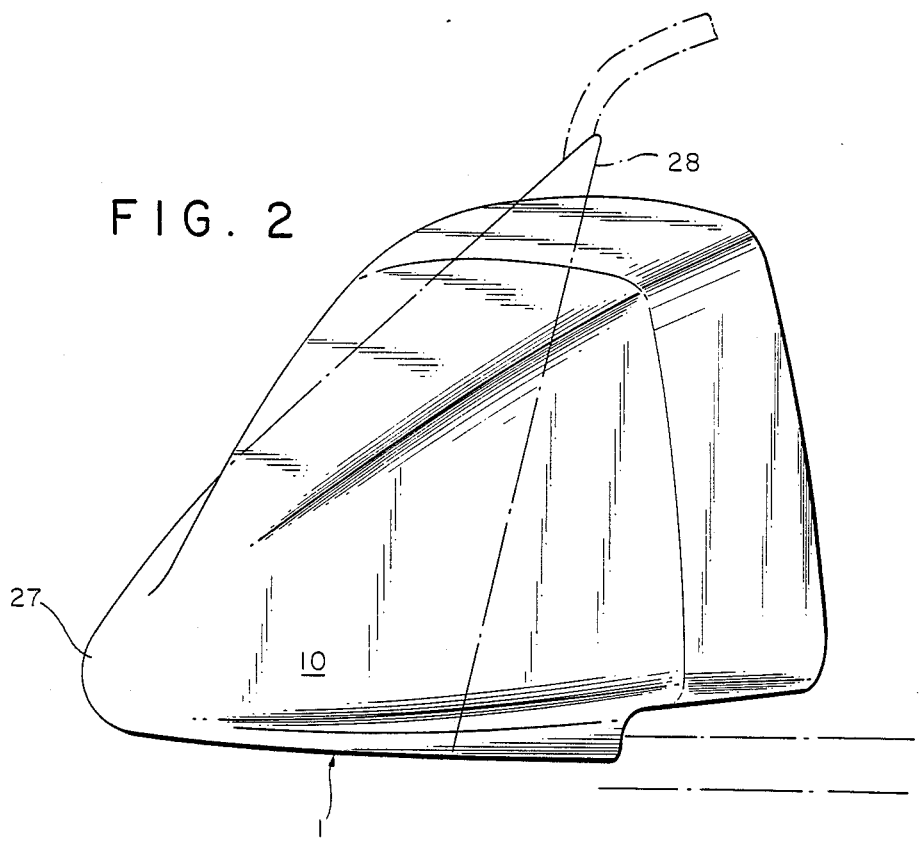
FIG. 2 shows an oblique front view of the exterior mirror shown in FIG. 1.

The exterior mirror described is suitable for use on a motor car, on which it is envisioned as installed in the top front quarter-portion of the driver's door.

The exterior mirror comprises a mirror housing 1 and a mirror mounting 2, on which the mirror housing 1 is held in the normal use position by means of two snap-in connections 3, 4 arranged one above the other. An adjusting mechanism, designated overall by 5, which is coupled inside the mirror housing 1 to the rear side of a mirror 6 and which can be operated from inside the vehicle in a conventional manner by means of a hand lever 7 for adjusting the mirror, extends through the mirror mounting 2.

The mirror 6 is clamped onto a joint ball so as to be pivotable about two mutually perpendicular axes, one of which runs approximately horizontally and the other of which extends upright. The ball joint 8 is mounted on pillars 9 which protrude from the inside of the forward mirror housing wall 10. The mirror 6 which is fixed on the mirror housing 1 in this way is in a conventional manner surrounded with a small clearance by a rearward edge bead 11 of the mirror housing 1.

A transverse wall 13 which has a conventional opening 14 for passing through the adjusting mechanism 5 extends in the mirror housing between that part 12 of the edge bead 11 which is near the mirror mounting and an opposing part of the forward mirror housing wall 10.

Figure 3:
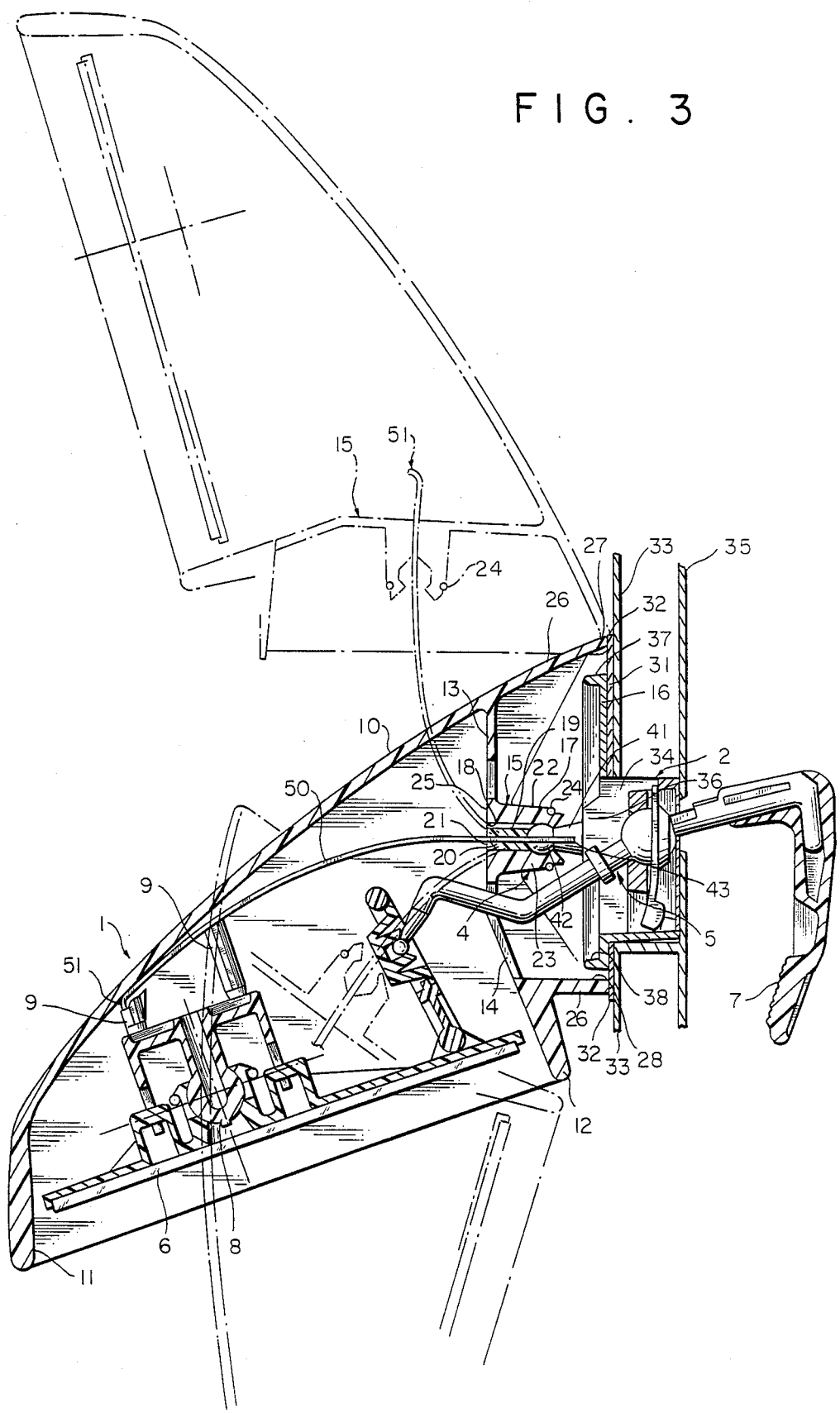
FIG. 3 shows a schematic representation in section through the exterior mirror shown in FIG. 1, approximately along the line A—A, the mirror housing being indicated as swung away backwards and forwards in dash-dot lines.

The lower snap-in connection 4 illustrated in cross-section in FIG. 3 includes a clip 15 which is integrally formed on the transverse wall 13 or is connected to it and whose opening faces the opposing essentially plate-shaped part 16 of the mirror mounting. The clip 15 has a solid body 17 through which there extends a slot 18 which, in the use position, is upright and penetrates the body 17 transverlely to part 16 of the mirror housing 2. Inside the slot 18, slide pieces 19, 20 are fixed to the front and rear wall, respectively, the slide pieces 19, 20 leaving free a further upright slot 21 between them which is explained below. In the direction of part 16, the clip 15 terminates in two opposing fingers 22, 23 which substantially enclose a cylindrical recess, having a vertical axis, of the clip 15. The external surfaces of the fingers 22, 23 are provided with an annular groove in which an annular spring 24 is held.

The clip (not shown) of snap-in connection 3 is located in alignment above clip 15 and is of similar design to the latter.

The mounting mirror 2 comprises the essentially plate-shaped part 16 which has already been mentioned, which remains outside the vehicle body when the exterior mirror has been fitted to the vehicle body and which rests by a rear face 31, via an interposed sealing strip 32 on, for example, the outer door panel 33 of the driver's door. The mirror mounting 2 furthermore has an inner part 34 which is connected to part 16 and, when the exterior mirror has been installed, is held between the outer door panel 33 and inner door panel 35 and is intended to accommodate a ball joint of the adjusting mechanism 5. Of course, part 16 and the inner part 34 have the necessary openings and perforations for the adjusting mechanism. A retention element 41 which tapers initially towards the outside and ends in a cylindrically shaped head 42 in each case rises from a thickened web 36 which projects from the inner surface of part 16 in the direction of the transverse wall. The retention elements are located opposite the clip 15 and the corresponding clip of snap-in connection 3. The head 42 is placed on the web 36 such that the fingers 22, 23 can engage around and behind the head 42, as FIG. 3 shows.

A vertical slot 43 which penetrates deep into the retention element 41 is cut into the head 42 from its outer end. That end of a spring steel band 50 which is at the mirror mounting side is permanently anchored in the vertical slot 43. The spring steel band 50 thus protrudes from the vertical slot 43, passes through the slot 21 between the slide pieces 19 and 20, and hence simultaneously passes through the transverse wall 13 and, in the normal use position, extends freely into the mirror housing 1 into the region of the pillars 9. At the end 51, remote from the mirror mounting, the spring steel band is bent laterally. Guide elements for the spring steel band inside the mirror housing 1, behind the transverse wall 13 are not shown. The guide elements limit the capacity of the spring steel band 50 to move freely sideways in the mirror housing 1. The width of the spring steel band 50 transverse to the cutting plane of FIG. 3 is selected so that the spring steel band 50 essentially fills the vertical slot 43 and slot 21. The inside width of slot 21 is chosen so that the slide pieces 19, 20 rest on the opposing side faces of the spring steel band 50.

It is to be emphasized that toward the mirror mounting 2, the mirror housing 1 ends in a peripheral edge 26 which rests without pressure on the outer door panel 33 via the above-mentioned sealing strip 32. The pressureless nature of the contact results from the fact that the mirror housing 1 is held on the mirror mounting 2 only via the snap-in connections 3, 4 and thus is not subject to any spring force directed toward the door panel 33. It is furthermore to be emphasized that the lateral extension of part 16 of the mirror mounting 2 is less than the area surrounded by the edge 26. It can be clearly seen in FIG. 3 that the horizontal extension of part 16 is less than the spacing between the forward edge section 27 and the rearward edge section 28 of the mirror housing 1. In the normal use position of the mirror housing 1, the mirror mounting 2 is, therefore, completely covered by the mirror housing.

When a forward-directed force or an impact from behind acts on the mirror housing 1, the snap-in connections 3, 4 can come apart in that the fingers 22, 23 by reason of their radial elasticity, come free from the positive gripping of the head 42 against the action of the annular spring 24, allowing the mirror housing 1 to pivot away forwards, as depicted in broken lines in FIG. 3, about the convex-shaped forward end of the forward edge section 27. During this pivoting-away movement, the slide pieces 19, 20, which, by reason of the general elasticity of the clip 15, reinforced by the annual spring 24, are pressed against the opposing side faces of the steel band 50, slide along the band 50 toward its end. By reason of its flexibility, the spring steel band 50 follows the pivoting movement of the mirror housing 1 until the end 51 rests against the rear side 25 of the clip 15 and thereby ends a further forward pivoting movement of the mirror housing 1. Since the spring steel band 50 is not only flexible but also elastic, the mirror housing 1, driven by the spring steel band 50, returns after the ending of the action of the force or impact into a position which is close to the normal use position of the mirror housing 1. The mirror housing 1 must then merely be pressed onto the vehicle body by hand in such a manner that the snap-in connections 3, 4 re-engage, i.e., the fingers 22, 23 once more take up the head 42 between them. Since, by reason of its clamping in the head 42, the steel band 50 has no freedom of movement upward or downward. The steel band prevents the mirror housing 1 from being delfected upward or downward when the mirror housing is swung away with respect to its normal use position, since the slot 21 prevents such a deflection movement.

During swinging away forwards, the forward end of the edge section 27 rolls on the sealing strip 32 and is supported in its further progress of the swinging-away movement on a shoulder 37 of part 16, the shoulder projecting outward from the plate-shaped part 16.

The mirror housing 1 can also yield to a blow acting on the mirror housing 1 from the front by swinging away backwards. As in the forward swinging-away movement, the snap-in connections 3, 4 come apart and the end of the rearward edge section 28 rolls on the sealing strip 32 and is supported on the rearward shoulder 38 which projects outward from part 16 in a manner similar to the forward shoulder 37. It goes without saying that, by dint of the essentially rectilinear rearward edge section 28, it is sufficient if the rearward edge section 28 rolls on the sealing strip 32 and is supported on the rearward shoulder 38 only at its two ends, the intermediate part of the rearward edge section moving out of contact with the sealing strip 32. The rearward end position of the backward swinging-away movement of the mirror housing 1 is again defined by the end 51 of the spring steel band 50 engaging behind the rear side 25 of the clip 15.

As indicated by FIG. 1, a spring steel band is permanently anchored in the retention element of each of the two snap-in connections 3,4 so that the lower spring steel band 50 and the upper spring steel band 52 lie vertically one above the other and have a spacing corresponding to the retention elements of the snap-in connections 3, 4 but otherwise run essentially parallel to one another.

In the description above, the term "forwards" is equivalent in meaning to pointing in the direction of travel of the vehicle when the rear-view mirror is fixed on the vehicle.

I claim:

1. An exterior mirror for a vehicle, said exterior mirror comprising:
    a mirror housing,
    a mirror fixed in said mirror housing,
    a mirror mounting holding said mirror housing in a normal use position, said mirror housing being swingable forwards and backwards relative to said mirror mounting,
    a retention member fixed on said mirror mounting and extending into said mirror housing, said retention member including at least one flexible band anchored at one end at said mirror mounting for allowing swinging of said mirror housing and for simultaneously holding said mirror housing in a horizontal plane with respect to said mirror mounting,
    means on said mirror housing for releasably coupling said mirror housing to said mirror mounting in said normal use position and for guiding said at least one flexible band when said mirror housing is released from its normal use position, said means including a slot for accommodating said at least one flexible band, said at least one flexible band extending through said slot to support said mirror housing and to define a path of travel of said mirror housing exclusively in said horizontal plane when said mirror housing swings forwards and backwards from its normal use position.

2. An exterior mirror as claimed in claim 1, wherein said at least one flexible band is made of spring steel.

3. An exterior mirror as claimed in claim 1, wherein said at least one flexible band is bent laterally at a free end, said free end engaging behind said slot in each of the forwards and backwards end positions of said mirror housing.

4. An exterior mirror as claimed in claim 1, wherein said retention member includes two bands of the same type which are arranged one above the other.

5. An exterior mirror as claimed in claim 4, wherein said two bands are vertically spaced.

6. An exterior mirror as claimed in claim 1, wherein at least one pair of round retention elements is arranged one above the other and project from said mirror mounting towards said mirror housing, in the normal use position of said mirror housing, elastic clips formed on said mirror housing and engaging around said at least one pair of round retention elements, and two retention elements arranged one above the other are formed approximately in a center of said mirror mounting, said elastic clips projecting from said inner part.

7. An exterior mirror as claimed in claim 6, wherein a wire spring engages around opposing fingers of each of said elastic clips.

8. An exterior mirror as claimed in claim 1, wherein said mirror mounting includes at least one mirror mounting part which, when said mirror mounting is fixed on a vehicle body, protrudes from the vehicle body so that in the normal use position, said mirror housing completely laterally surrounds said at least one mirror mounting part of said mirror mounting and an edge of said mirror housing which is located at the mirror mounting side of the vehicle rests without pressure against the vehicle body.

9. An exterior mirror as claimed in claim 8, wherein an elastic sealing strip is laid between the vehicle body and said edge of said mirror housing which is located at the mirror mounting side.

10. An exterior mirror as claimed in claim 8, wherein during the swinging, forwards and backwards, in each case, one edge section of said mirror housing at the mirror mounting side is supported on, in each case, one projecting shoulder of said at least one mirror mounting part.

11. An exterior mirror as claimed in claim 1, wherein said at least one flexible band is resilient through a single plane.

12. An exterior mirror for a vehicle, said exterior mirror comprising:
   a mirror housing,
   a mirror fixed in said mirror housing,
   a mirror mounting holding said mirror housing in a normal use position, said mirror housing being able to be swung forwards and backwards relative to said mirror mounting,
   a retention member fixed on said mirror mounting and extending into said mirror housing, said retention member including at least one flexible band anchored at one end at said mirror mounting and extending through a slot in an inner part of said mirror housing, said inner part being located adjacent said mirror mounting,
   at least one pair of round retention elements arranged one above the other and projecting from said mirror mounting towards said mirror housing, in the normal use position of said mirror housing,
   elastic clips formed on said mirror housing and engaging around said at least one pair of round retention elements,
   two retention elements of said at least one pair of round retention elements being arranged one above the other and formed approximately in a center of said mirror mounting, said elastic clips projecting from said inner part, said slot being formed in at least one of said elastic clips and said at least one pair of round retention elements associated with said elastic clips being slotted so that an end of said at least one flexible band which is at said mirror mounting side is anchored in said at least one pair of round retention elements associated with said elastic clips.

13. An exterior mirror as claimed in claim 12, wherein said at least one pair of round retention elements have a cylindrical outer contour engaged by said elastic clips.

14. An exterior mirror for a vehicle, said exterior mirror comprising:
   a mirror housing,
   a mirror fixed in said mirror housing,
   a mirror mounting holding said mirror housing in a normal use position, said mirror housing being able to be swung forwards and backwards relative to said mirror mounting,
   a retention member fixed on said mirror mounting and extending into said mirror housing, said retention member including at least one flexible band anchored at one end at said mirror mounting and extending through a slot in an inner part of said mirror housing, said inner part being located at a mirror mounting side of the vehicle body,
   two opposing slide pieces provided in said slot, each of said two opposing slide pieces resting on a different slide of said at least one flexible band.

* * * * *